United States Patent [19]

Mihara et al.

[11] 4,347,412

[45] Aug. 31, 1982

[54] HANDLE LOCK DEVICE FOR A SWITCH

[75] Inventors: Kazunobu Mihara; Kazuyoshi Sugihara, both of Fukuyama, Japan

[73] Assignee: Mitsubishi Denki Kabushiki Kaisha, Tokyo, Japan

[21] Appl. No.: 109,400

[22] Filed: Jan. 3, 1980

[30] Foreign Application Priority Data

Jan. 12, 1979 [JP] Japan .............................. 54-3170[U]
Jun. 16, 1979 [JP] Japan .............................. 54-3677[U]

[51] Int. Cl.[3] ......................... E05B 65/00; H01H 9/20; H02H 11/00

[52] U.S. Cl. .................................... 200/42 T; 70/203; 70/DIG. 30

[58] Field of Search ................. 70/DIG. 30, 203, 202, 70/200, 199, 237, 254, 57, 166, 164; 200/42 T, 44, 334

[56] References Cited

U.S. PATENT DOCUMENTS

| | | | |
|---|---|---|---|
| 2,192,060 | 2/1940 | Wise | 200/42 T |
| 2,663,768 | 12/1953 | Sorensen | 200/42 T |
| 2,813,938 | 11/1957 | Speizman | 200/42 T |
| 3,197,581 | 7/1965 | Clifford | 200/42 T |
| 3,327,075 | 6/1967 | Phillipson | 200/42 T |
| 3,416,123 | 12/1968 | Husebo | 70/164 X |
| 3,422,389 | 1/1969 | Husebo | 70/164 X |

FOREIGN PATENT DOCUMENTS

| | | | |
|---|---|---|---|
| 402993 | 9/1968 | Australia | 70/203 |
| 404976 | 9/1968 | Australia | 70/203 |
| 1155963 | 5/1958 | France | 200/42 T |
| 765724 | 1/1957 | United Kingdom | 200/42 T |

*Primary Examiner*—Roy D. Frazier
*Assistant Examiner*—Carl F. Pietruszka
*Attorney, Agent, or Firm*—Wenderoth, Lind & Ponack

[57] ABSTRACT

A handle lock device for a switch, to be mounted to a switch manipulation handle protruded through a handle manipulation opening of a case in which a switching mechanism of the toggle-type is contained, is a lock cover which has a portion elongated so as to be introduced into the handle manipulation opening, whereby the lock cover prevents sufficient handle swing to effect the switching, since one of the side surfaces of the elongated portion is adapted to abut one of the end surfaces of the handle manipulation opening before the toggle-link goes over its dead center. The handle lock device makes it possible that a single lock cover can be used to lock handles of switches having different angles in the "on" and "off" states, and also that the handle may be easily and simply locked by a locking means having a simple constitution.

1 Claim, 14 Drawing Figures

HANDLE LOCK DEVICE FOR A SWITCH

BACKGROUND OF THE INVENTION

1. Field of the Invention

The present invention relates to a switch and more particularly to a handle lock device for a switch.

2. Description of the Prior Art

One known prior art handle lock device for a switch is shown in FIGS. 1 to 4, wherein FIG. 1 is a side elevation view of the hitherto used handle lock device for a switch provided with a locking means; FIG. 2 is a plan view of the switch in its assembled state; and FIGS. 3 and 4 are side elevational views, partly broken away, showing the switch in the "on" and "off" states, respectively.

As shown in FIGS. 1 to 4 a handle lock member 1 is provided with a hole 1*a* adapted to have passed therethrough a shackle part 4*a* of a padlock 4, and has its lower portion provided with projections 1*c* and 1*c'* such that the under surface of handle lock member 1 and the under surfaces both of projections 1*c* and 1*c'* lie on an arcuate surface 1*b* so as to rest on an arcuate surface 3*a* of a handle 3, whereby the free ends of projections 1*c* and 1*c'* act to prevent the lock member 1 from being removed from housing 2.

Handle lock member 1 is mounted, as shown in FIGS. 3 and 4, within an opening 2*a* of a switch having 2 such that arcuate surface 1*b* of handle lock member 1 comes into contact with arcuate surface 3*a* of handle 3, and e.g. as shown in FIG. 3, when switch 2 is in the "on" state, if padlock 4 is inserted into hole 1*a* of handle lock member 1, the shackle part 4*a* of padlock 4 acts as a stop to block the movement of handle 3 from the "on" to the "off" position and serves to lock handle 3 in the "on" state. Similarly, FIG. 4 shows that padlock 4 can lock the handle "off". Thus, a single handle lock member 1 can serve to lock handle 3 in either the "on" or the "off" position. Projections 1*c* and 1*c'* engage under the edge defining opening 2*a* to prevent removal of lock member 1.

However, in such a construction there is a limit imposed by the diameter of the shackle 4*a* of padlock 4 so that not every padlock can be used. Further, padlocks have low reliability and little versatility. Moreover, since handle lock member 1 which is usually formed of metal such as steel plate, stainless steel plate, etc. is mounted within opening 2*a* of switch 2 with arcuate surface 1*b* of handle lock member 1 in contact with arcuate surface 3*a* of handle 3, handle lock member 1 necessarily comes near to a part of a toggle link mechanism (not shown) which is always charged with an electrical potential, so this is not desirable from the view point of safety and electrical insulation.

In order to obviate such a defect a device such as shown in FIGS. 5 to 9 has been proposed, wherein FIG. 5 is a plan of the device, FIG. 6 a partial sectional side elevational view, showing the switch in the "on" state, FIG. 7 is a view similar to FIG. 6, but showing the switch in the "off" state, and FIGS. 8 and 9 are a plan and a sectional side elevational view, respectively, of the essential portion.

It is generally the case that angles $\theta_1$ and $\theta_2$ between the axis of a handle 3 and the surface of a switch case 2 in the "on" and "off" positions are not equal. In FIGS. 5 to 9, protruding from switch case 2 molded of insulation material to protect elements contained within it is handle 3 of the switch, and on one surface of handle 3 is provided a groove 3*c*, and filled with white paint, so as to be visible outside case 2 only when the switch is in the "on" position, whereas when the switch is changed over by movement of the handle 3 to the "off" position, the white line marking groove 3*c* is concealed within case 2. Thus, the difference between the "on" and "off" positions can be readily discerned. Further, in FIGS. 5 to 9 lock covers 5 and 5' can be mounted on case 2, each having an inclined groove 5*a* or 5*a'* therein, and the lower end face 5*f* or 5*f'* is adapted to abut one end surface 2*b* of the frame around the opening in case 2 to lock handle 3 in the "on" or "off" position. In this case, as described above, since it is very rare that $\theta_1$ is equal or nearly equal to $\theta_2$, it is necessary to provide two lock covers 5 and 5', respectively, each having an inclined groove 5*a* or 5*a'* at a different oblique angle $\theta_1$ or $\theta_2$ to accomodate the handle in the respective positions, as shown in FIGS. 6 and 7.

Thus, it will be appreciated that a construction such as shown in FIGS. 5 to 9 can obviate the defects inherent to the construction shown in FIGS. 1 to 4, but the former has another defect, namely that since two kinds of lock covers 5 and 5' have to be provided, it is very troublesome to manipulate and also makes the construction expensive. Further, since lock covers 5 and 5' conceal the white groove 3*c* in handle 3 as well as the words "on" and "off" marked on case 2, obstructions to the manipulation may be brought about. Moreover, since the upper end face 2*b* of the frame is utilized the area of the lower end surfaces 5*f* and 5*f'* of lock covers 5 and 5' are apt to be larger than the area of the frame of case 2 so that if the switch is to be embedded type or the like, it is very difficult to remove the flush plate with the lock cover in place.

In view of the above defects inherent in the hitherto publicity known handle lock devices for switches, it is a principal object of the present invention to provide a handle lock device for a switch which can overcomes the defects found in the above described conventional types.

It is another object of the present invention to provide a handle lock device for a switch in which a single lock cover makes it possible to carry out the locking action for a switch having a different handle angle in the respective "on" and "off" positions of the switch.

In accordance with the present invention a handle lock device for a switch having a case containing a switching mechanism of the toggle link type and a handle to manipulate the switching mechanism projecting through a handle manipulation opening of the case is provided which comprises a a single-piece cover member of molded insulation material detachably fitted over said handle when said handle is in either of said two extreme positions, said cover member including: (a) a cover portion which closely covers only the portion of the handle which extends outside the opening of the case; and (b) an elongated portion integral with said cover portion and extending generally laterally of said portion and having a size for substantially filling said space which is between the handle and the other end of the opening when the handle is in one of the two extreme positions, thereby preventing the handle from substantially deviating from said one position.

In accordance with one aspect of the present invention the lock cover can cooperate with a detent means which is adapted to secure the lock cover and the handle together, and prevents the former from being separated from the latter when a locking means such as a padlock is used.

BRIEF DESCRIPTION OF THE DRAWINGS

The above brief description, as well as further objects, features and advantages of the present invention will be more fully understood by reference to the following detailed description of the presently preferred, but nonetheless illustrative embodiments in accordance with the present invention, when taken in conjunction with the accompanying drawings, wherein.

DETAILED EXPLANATION OF THE PREFERRED EMBODIMENTS

Figure 1:
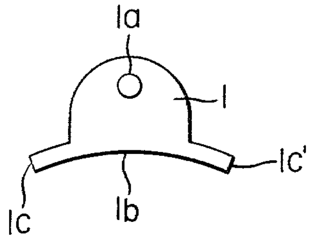
FIG. 1 is a side elevational view of a handle lock device provided with a locking means for a switch hitherto known.
Figure 2:
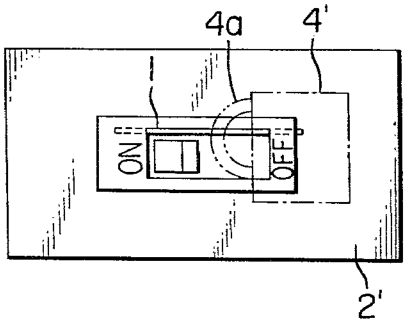
FIG. 2 is a plan view showing the mounting of the handle lock device shown in FIG. 1 on the switch.
Figure 3:
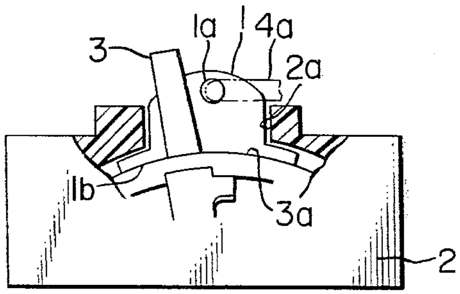
FIGS. 3 and 4 are partial sectional side elevational views of the switch to show the handle lock device in the "on" and "off" positions, respectively.
Figure 4:
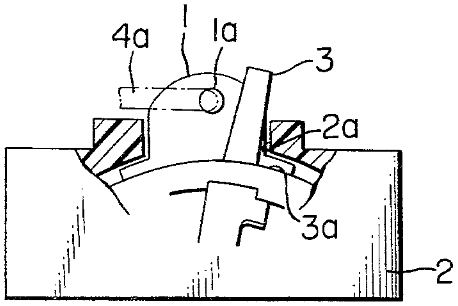
Figure 5:
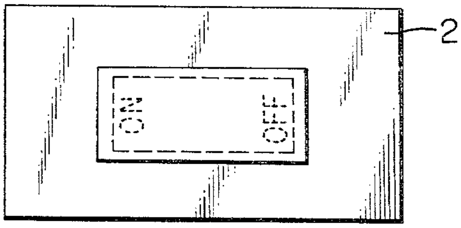
FIG. 5 is a plan view of another handle lock device for a switch hitherto known.
Figure 6:
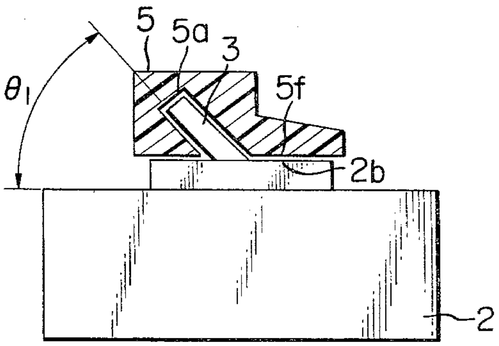
FIGS. 6 and 7 are partial sectional side elevational views of the switch shown in FIG. 5, in the "on" and "off" positions, respectively.
Figure 7:
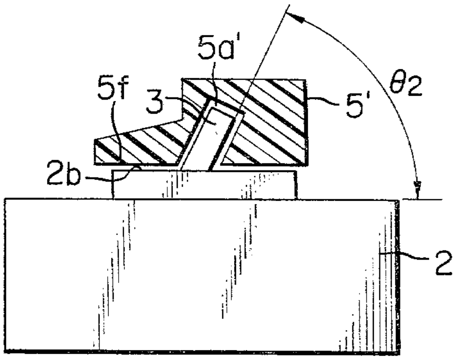
Figure 8:
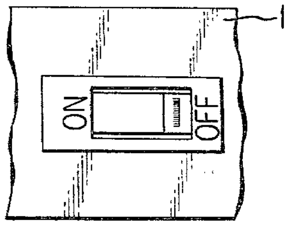
FIG. 8 is a plan view of the switch of FIG. 5 with the handle lock device removed.
Figure 9:
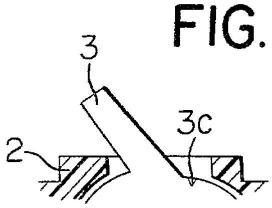
FIG. 9 is a side sectional elevational view of the switch of FIG. 8.
Figure 10:
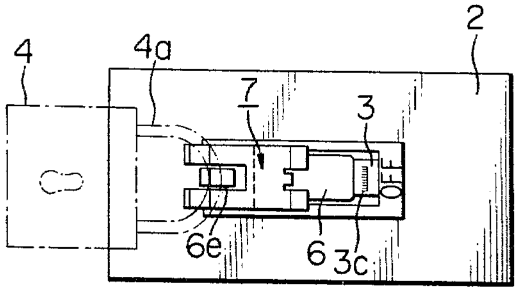
FIG. 10 is a plan view of one embodiment of a handle lock device according to the present invention together with the switch on which the device is mounted.
Figure 11:
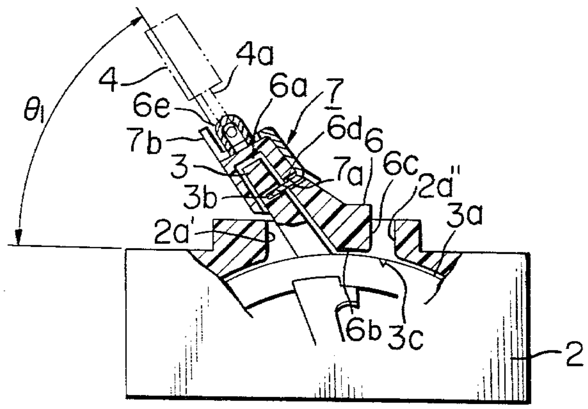
FIGS. 11 and 12 are partial sectional side elevational views of the handle lock device shown in FIG. 10 in the "on" and "off" positions of the switch, respectively.
Figure 12:
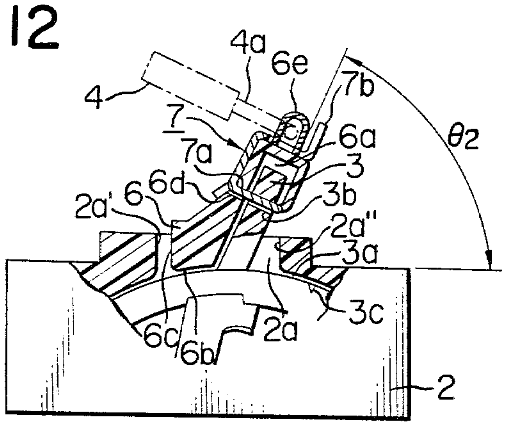
Figure 13:
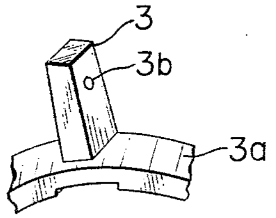
FIGS. 13 and 14 are enlarged perspective views of the handle and the detent, respectively, of the device shown in FIGS. 10 and 12.

Referring now to FIGS. 10 to 12, wherein the reference numeral 2 designates a case for a switch, 3 a handle to manipulate a switching mechanism and protruding through a handle manipulation opening 2*a* formed in case 2, and 6 a lock cover having an axial opening 6*a* therein to be fitted over handle 3 similarly to conventional switches. In use, lock cover 6 is mounted on handle 3 in a hat-like fashion with handle 3 being introduced into opening 6*a*. The bottom end surface 6*b* and one of the end surfaces 6*c* of lock cover 6 are always positioned within handle manipulation opening 2*a* when the cover 6 is fitted over the protruding handle 3. Lock cover 6 is so shaped as to be able to be used when the handle 3 is at different angles $\theta_1$ and $\theta_2$ for the make and break conditions of the switch or even with different kinds of switches, i.e. lock cover 6 is so dimensioned that it will cover all dimensions of switches manufactured. Further, lock cover 6 is also so constituted that, as shown in FIGS. 10 and 11, at the time of closing, i.e. in the "on" position of the switch, a marking groove 3*c*, filled with white paint, provided on handle 3 on one surface is visible from the outside, and, when it is attempted to manipulate lock cover 6 to open the switch the end surface 6*c* abuts against one end surface 2*a*″ of handle manipulation opening 2*a* before the switching is actually effected. That is, this utilizes the characteristic of the toggle link mechanism (not shown) of the switch that handle 3 is returned to the original position even if it is moved some way, or the switching operation takes place, as long as the toggle link mechanism is not caused to go over its dead center position.

On the other hand, when the switch is open, i.e. in the "off" condition, when it is tried to move the lock cover 6 to close the switch, the end surface 6*c* of lock cover 6 is adapted to abut the other end surface 2*a*′ of handle manipulation opening 2*a* to effect the lock action as shown in FIG. 12. Preferably, the lock cover 6 has an inverted U-shaped configuration with one of the legs being elongated and disposed within handle manipulation opening 2*a* of case 2 and one of end surfaces 6*c* of the lower part of the elongated leg portion is opposed to the inner end surfaces 2*a*′ or 2*a*″ of handle manipulation opening 2*a* of case 2. Thus, it will be appreciated that in the embodiment described above and shown in FIGS. 10 to 12 a single lock cover 6 can lock a switch handle in both the "on" and "off" positions even if $\theta_1$ and $\theta_2$ are different in the respective "on" or "off" conditions of the switch. Further, white marking groove 3*c* on handle 3 or such markings as "on" and "off" on the upper end surface of case 2 are not concealed by lock cover 6, so the switch with the lock device does not lose the ability to show that it has been tripped.

Figure 14:
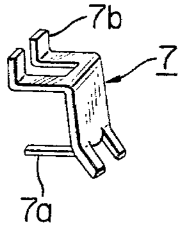

According to a further feature of the present invention the handle lock device can be associated with a locking means to be described below. As shown in FIGS. 11 and 12 an opening 6*d* is formed in the trunk body of lock cover 6 at a predetermined position, and a similar opening 3*b* is also provided in handle 3 at a position aligned with opening 6*d*. As shown in FIG. 14 a detent 7 made of a sheet metal is separately prepared to provide a tongue like portion, i.e. a first engaging member 7*a*, centrally at one end by bending a portion of the main body at right angles thereto, and a pair of L-shaped portions with a void therebetween, i.e. a second engaging member 7*b*, at the other end by bending the main body at right angles substantially parallel with wire-like portion 7*a* with the free ends being bent upwards. Detent 7 is adapted to be used to secure handle 3 and lock cover 6 together with tongue-like portion 7*a* being introduced into openings 3*b* and 6*d* of handle 3 and lock cover 6, whereby each of the L-shaped portions 7*b* lies on the top of lock cover 6 with a projection 6*e* integrally protruding from the top of lock cover 6 therebetween, projection 6*e* having a transverse opening therethrough. See FIGS. 10 to 12. With the detent 7 mounted on the handle 3 and lock cover 6 as above explained, if a shackle 4*a* of a padlock 4 is passed through the opening of projection 6*e* of lock cover 6, even if one tries to remove detent 7 from lock cover 6, L-shaped portions 7*b* come into contact with shackle 4*a* of padlock 4 so that detent 7 cannot be removed. Further, in this case, the engagement of lock cover 6 with handle 3 is ensured by wire-like portion 7*a* of detent 7 so that the handle lock device becomes a handle lock device provided with a locking means.

It is also to be noticed that, as will be apparent from FIGS. 11 and 12, since detent 7 is in a portion remote from the interior of the case 2, i.e. where the toggle-link mechanism (not shown) is located, it is not subjected to any electrical potential, and the handle lock device according to the present invention is safe.

From the foregoing, it will be appreciated that according to the present invention, a handle lock device for a switch is provided in which locking of a handle positioned at different angles in the "on" and "off" states of the switch can be performed with ease using a single lock cover and at the same time the locking of the switch can be performed simply and easily by a simple mechanism, thus providing a handle lock device for a switch which is cheap, safe and has high reliability.

The invention has been described with particular reference to the preferred embodiments, but it will be understood that variations and modifications within the spirit and scope of the invention may occur to those skilled in the art to which the invention pertains.

What is claimed is:

1. A handle lock device for use with a switch device, the switch device including a case having an elongated opening with two extreme ends, and a rod-shaped handle extending through and movable within said opening and which is capable of being moved between the two extreme positions and when said handle is at one extreme, a space is formed between said handle and the other end of the opening, said handle lock device comprising:

a single-piece cover member detachably fitted over said handle when said handle is in either of said two extreme positions, said cover member having:

(a) a cover portion which closely covers only the portion of the handle which extends outside the opening of the case;

(b) an elongated portion integral with said cover portion and extending generally laterally of said portion and having a size for substantially filling said space which is between the handle and the other end of the opening when the handle is in one of the two extreme positions, thereby preventing the handle from substantially deviating from said one position;

(c) a projection extending from the end of said cover portion at the free end of the handle and having an aperture therethrough transversely of the handle; and (d) an aperture in said cover portion at a position intermediate the length of the cover portion and extending in a direction generally perpendicular to the direction of said aperture in said projection; and a separate detent member removably mounted on said cover member and having a tongue portion through said aperture in said cover portion and being sufficiently long for engaging in a hole in the handle when said cover member is on the handle for holding said cover member on the handle, and a cover engaging portion connected to said tongue portion and engaging the end of said cover portion from which said projection extends and having a slot extending inwardly from the free end of said cover engaging portion with the parts on the opposite sides of the slot lying on opposite sides of said projection, the ends of said parts on opposite sides of said slot being bent outwardly away from the end of said cover portion and extending past said aperture in said projection, whereby when a lock hasp is passed through said aperture in said projection, the hasp blocks movement of said outwardly bent ends of said parts from being moved past said projection, thereby preventing movement of said tongue out of said cover portion and thus locking the detent member to the cover member and the cover member to the handle.

* * * * *